United States Patent
Okaniwa et al.

(10) Patent No.: US 9,515,554 B2
(45) Date of Patent: Dec. 6, 2016

(54) POWER SUPPLY THAT CHARGES AN ELECTRIC STORAGE BY REGENERATIVE POWER GENERATED BY A GENERATOR AND SUPPLIES POWER TO A LOAD

(71) Applicants: Masakazu Okaniwa, Aichi (JP); Yoshihiro Ikushima, Aichi (JP)

(72) Inventors: Masakazu Okaniwa, Aichi (JP); Yoshihiro Ikushima, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 52 days.

(21) Appl. No.: 14/695,738

(22) Filed: Apr. 24, 2015

(65) Prior Publication Data
US 2015/0311799 A1 Oct. 29, 2015

(30) Foreign Application Priority Data
Apr. 25, 2014 (JP) .................. 2014-090891

(51) Int. Cl.
*H02M 3/158* (2006.01)
*B60L 1/00* (2006.01)
*H02J 7/00* (2006.01)

(52) U.S. Cl.
CPC ............ *H02M 3/158* (2013.01); *B60L 1/00* (2013.01); *H02J 7/0063* (2013.01)

(58) Field of Classification Search
CPC .... H02M 3/155; H02M 3/156; H02M 3/158; G05F 1/56
See application file for complete search history.

(56) References Cited

U.S. PATENT DOCUMENTS

| 5,021,727 | A * | 6/1991 | Mashino | H02J 7/1438 322/28 |
|---|---|---|---|---|
| 2003/0155814 | A1* | 8/2003 | Gronbach | B60L 11/1868 307/130 |
| 2009/0051337 | A1* | 2/2009 | Yoshida | H02M 3/158 323/283 |
| 2009/0314561 | A1* | 12/2009 | Handa | F02N 11/0866 180/65.25 |
| 2010/0060252 | A1* | 3/2010 | Nishimura | H01M 10/441 323/282 |
| 2010/0231178 | A1* | 9/2010 | Handa | H02J 7/0065 320/163 |
| 2010/0289452 | A1* | 11/2010 | Wagatsuma | B60K 6/28 320/109 |
| 2010/0308659 | A1* | 12/2010 | Morita | H01M 10/44 307/66 |
| 2011/0140518 | A1* | 6/2011 | Hattori | H02J 7/1423 307/9.1 |
| 2012/0032504 | A1* | 2/2012 | Akimasa | H01M 10/44 307/9.1 |
| 2013/0106180 | A1* | 5/2013 | Akimasa | F02N 11/0814 307/9.1 |

(Continued)

FOREIGN PATENT DOCUMENTS

JP 2011-155791 A 8/2011
JP 4835690 B2 12/2011

*Primary Examiner* — Matthew Nguyen
*Assistant Examiner* — Yusef Ahmed
(74) *Attorney, Agent, or Firm* — Osha Liang LLP

(57) ABSTRACT

A power supply includes: a first connection terminal connectable with a DC power supply to which a first load and a generator are connected in parallel; a second connection terminal connectable with an electric storage which stores regenerative power generated by the generator; a third connection terminal connectable with a second load; a DC-DC converter; and a controller which controls the DC-DC converter. The power supply further includes: a first power path including one end connected to the first connection terminal and the other end connected to a first input/ output terminal of the DC-DC converter; a second power path including one end connected to the second connection terminal and the other end connected to a second input/output terminal of the DC-DC converter; and a third power path including one end connected to the third connection terminal and the other end connected to the second power path.

6 Claims, 15 Drawing Sheets

(56) References Cited

U.S. PATENT DOCUMENTS

| | | | | |
|---|---|---|---|---|
| 2013/0110339 A1* | 5/2013 | Akimasa | H02J 7/1438 | 701/22 |
| 2013/0154371 A1* | 6/2013 | Ju | H02J 7/1461 | 307/31 |
| 2013/0289854 A1* | 10/2013 | Takahashi | B60L 11/1809 | 701/112 |
| 2015/0001857 A1* | 1/2015 | Sekiguchi | B60L 7/10 | 290/38 C |
| 2015/0002125 A1* | 1/2015 | Kinoshita | H02M 3/158 | 323/285 |
| 2015/0012175 A1* | 1/2015 | Hara | B60R 16/03 | 701/36 |
| 2015/0092454 A1* | 4/2015 | Cohen | H02M 3/33546 | 363/21.07 |
| 2015/0097507 A1* | 4/2015 | Kim | H02M 7/797 | 318/504 |
| 2015/0251544 A1* | 9/2015 | Sugiyama | B60L 1/00 | 307/10.6 |
| 2015/0291039 A1* | 10/2015 | Sakata | H01M 10/441 | 307/10.1 |
| 2015/0311848 A1* | 10/2015 | Maruyama | H02J 7/163 | 318/490 |
| 2015/0314740 A1* | 11/2015 | Reichow | B60R 16/03 | 701/36 |
| 2015/0318784 A1* | 11/2015 | Wu | H02M 3/158 | 323/283 |
| 2015/0352968 A1* | 12/2015 | Date | B60L 3/0046 | 307/10.1 |
| 2016/0016483 A1* | 1/2016 | Yasunori | B60L 11/14 | 320/162 |

\* cited by examiner

WHEN POWER IS NOT GENERATED AND STARTER MOTOR IS NOT ACTUATED

POWER SUPPLY THAT CHARGES AN ELECTRIC STORAGE BY REGENERATIVE POWER GENERATED BY A GENERATOR AND SUPPLIES POWER TO A LOAD

CROSS-REFERENCES TO RELATED APPLICATIONS

This application is based upon and claims the benefit of priority from Japanese Patent Application No. 2014-90891, filed on Apr. 25, 2014; the entire contents of which are incorporated herein by reference.

FIELD

One or more embodiments of the present invention relate to a power supply that charges an electric storage by regenerative power generated by a generator and supplies power of the electric storage or a DC power supply to a load.

BACKGROUND

In order to protect the environment of the earth or to improve a fuel consumption rate (fuel economy), a vehicle having an idling stop function and a deceleration regeneration function has been developed. Such a vehicle is provided with a power supply in which an electric storage stores regenerative power generated by a generator and that supplies power of the electric storage or power of a battery (DC power supply) to a load when the vehicle is decelerated.

For example, in a power supply illustrated in Japanese Unexamined Patent Application Publication No. 2011-155791 or a power supply illustrated in FIG. 7 of Japanese Patent No. 4835690, a switch is provided in a power path between a load (narrow voltage range auxiliary) which requires protection so as not to decrease a supply voltage and a battery. Furthermore, an electric storage is connected to a power path between the load and the switch through a DC-DC converter. A generator, a starter motor, or another load (auxiliary, wide voltage range auxiliary) is connected to the power path between the battery and the switch.

For example, when the regenerative power is generated by the generator due to deceleration of the vehicle, the switch is turned on and the DC-DC converter charges the electric storage by the regenerative power. In addition, if the vehicle is in a state other than an idling stop, when the regenerative power is not generated by the generator, the switch is turned on and the DC-DC converter discharges the electric storage. In this case, in Japanese Unexamined Patent Application Publication No. 2011-155791, the DC-DC converter discharges the electric storage until a voltage by which the DC-DC converter can be operated and the electric storage can continuously drive the load over a predetermined period of time in which the voltage of the battery is lowered momentarily.

When restarting an engine after the idling stop of the vehicle, the starter motor is actuated and thereby a large current flows through the starter motor and the voltage of the battery is lowered momentarily. Thus, in this case, the switch is turned off, the load and the electric storage are electrically disconnected from the battery and the starter motor, and power of the electric storage is supplied to the load through the DC-DC converter. Thus, the load is stably and continuously driven by power of the electric storage.

SUMMARY

An object of one or more embodiments of the present invention is to provide a power supply that stably supplies power to a load and can effectively use regenerative power.

According to an aspect of the present invention, there is provided a power supply including: a first connection terminal connectable with a DC power supply to which a first load and a generator are connected in parallel; a second connection terminal an electric storage which stores regenerative power generated by the generator; a third connection terminal connectable with a second load; a DC-DC converter; a controller which controls an operation of the DC-DC converter; a first power path including one end connected to the first connection terminal and the other end connected to a first input/output terminal provided in the DC-DC converter; a second power path including one end connected to the second connection terminal and the other end connected to a second input/output terminal provided in the DC-DC converter; and a third power path including one end connected to the third connection terminal and the other end connected to the second power path.

In this case, the second load is connected to the second power path between the DC-DC converter and the electric storage through the third power path. Thus, it is possible to supply power of the DC power supply to the first load and supply power of the DC power supply to the second load through the first power path, the DC-DC converter, and the third power path. Furthermore, it is possible to charge the electric storage by supplying the regenerative power generated by the generator to the electric storage through the first power path, the DC-DC converter, and the second power path. Furthermore, it is possible to supply power of the electric storage to the second load through the second power path and the third power path. Thus, power is stably supplied to the first load and the second load, and it is possible to effectively use the regenerative power.

Furthermore, in one or more embodiments of the present invention, the power supply may further include a fourth power path including one end connected to the first power path and the other end connected to the third power path; and a rectifier which is provided on the fourth power path and which makes a current flow from a first power path side to a third power path side.

Furthermore, in one or more embodiments of the present invention, the power supply may further include a first switching element provided on the fourth power path; a second switching element provided between a connection point to the third power path on the second power path and the second connection terminal; and a third switching element provided between a connection point to the fourth power path on the third power path and the second power path. The controller may control an on/off operation of each of the switching elements.

Furthermore, in one or more embodiments of the present invention, in the power supply, the first switching element may include a field effect transistor and the rectifier may include a diode connected in parallel to the first switching element. In this case, the diode connected in parallel to the first switching element may include an anode connected to the first power path and a cathode connected to the third power path.

Furthermore, in one or more embodiments of the present invention, in the power supply, the second switching element may include a field effect transistor to which a diode is connected in parallel. In this case, the diode connected in parallel to the second switching element may include an anode connected to the second connection terminal and a cathode thereof connected to the third power path and the second input/output terminal of the DC-DC converter.

Furthermore, in one or more embodiments of the present invention, in the power supply, the third switching element may include a pair of field effect transistors which are connected in series and which are connected in parallel to diodes, respectively. In this case, a direction of the diode connected in parallel to one of the pair of field effect transistors may be opposite to a direction of the diode connected in parallel to the other of the pair of field effect transistors.

Furthermore, in one or more embodiments of the present invention, in the power supply, the first load may include a large current load through which a large current flows when actuated, and the second load may include a protected load required to be protected so as not to lower a voltage to be supplied, and the power supply may further include a voltage detector which detects a voltage of the electric storage. In this case, when the large current load is actuated, the controller may turn on only the second switching element and the third switching element and may supply power from the electric storage to the protected load if the voltage of the electric storage detected by the voltage detector is equal to or larger than a predetermined value required to drive the protected load. Meanwhile, if the voltage of the electric storage detected by the voltage detector is less than the predetermined value, the controller may turn on only the third switching element, may control driving of the DC-DC converter, and may supply power of the DC power supply to the protected load.

Furthermore, in one or more embodiments of the present invention, in the power supply, when the regenerative power is generated by the generator, the controller may turn on only the first switching element and the second switching element, may supply the regenerative power to the second load, may control driving of the DC-DC converter, and may charge the electric storage by the regenerative power. Furthermore, when the large current load included in the first load is in a state other than actuation and power is not generated by the generator, the controller may turn on only the first switching element and the second switching element, may supply power of the DC power supply to the second load, may control the driving of the DC-DC converter, and may discharge the electric storage.

According to one or more embodiments of the present invention, it is possible to provide the power supply that stably supplies power to the load and can effectively use the regenerative power.

DETAILED DESCRIPTION

Figure 1:
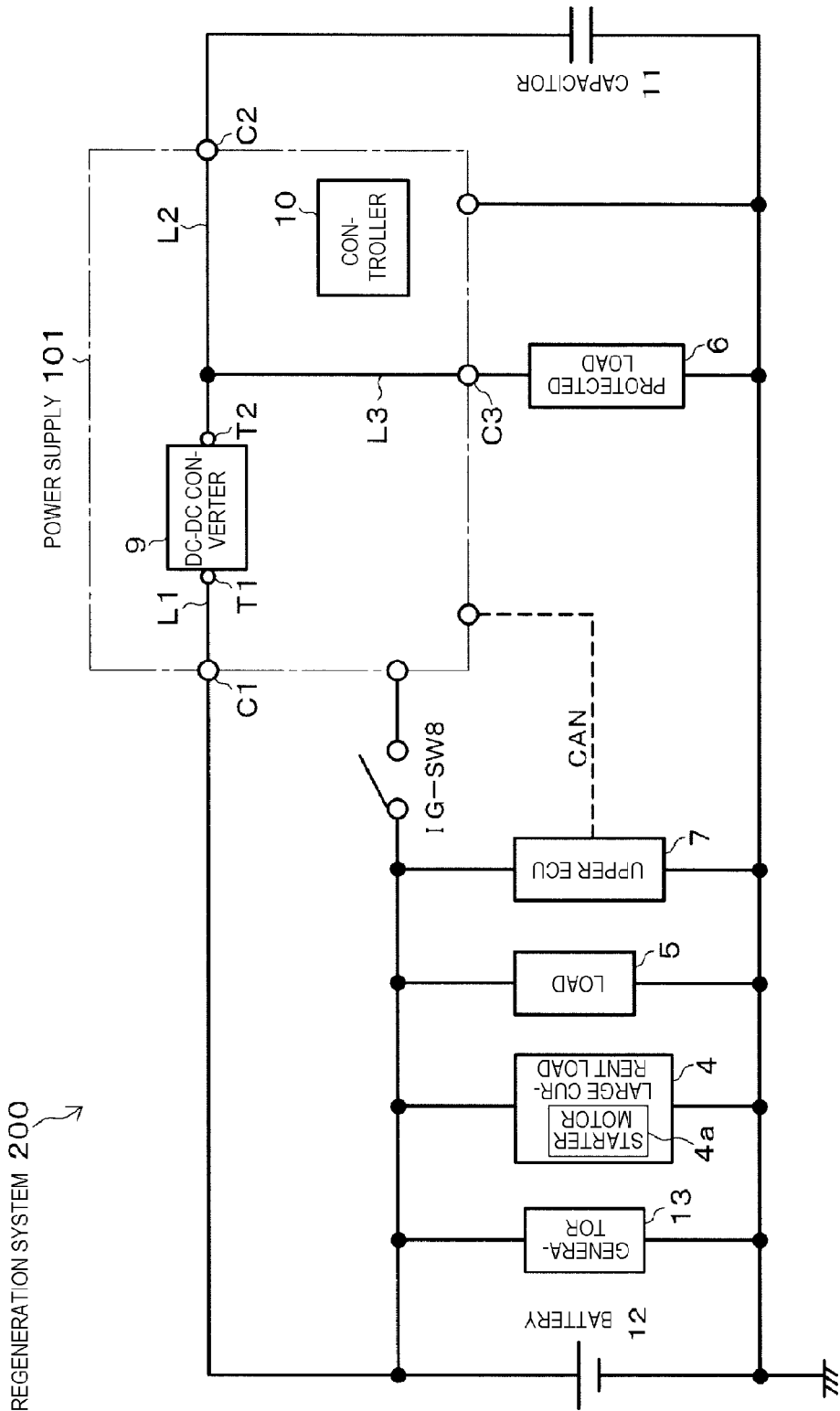
FIG. 1 is a diagram illustrating a circuit configuration of a power supply of a first embodiment of the invention.

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

Hereinafter, embodiments of the invention will be described with reference to the drawings. In each drawing, the same reference numerals are given to the same portions or corresponding portions.

First, a power supply 101 of a first embodiment and a circuit configuration of peripheral sections thereof will be described with reference to FIG. 1. Moreover, in FIG. 1, a solid line indicates wiring of a power system and a broken line indicates wiring of a control system or wiring of a communication system (hereinafter, the same applies to each view).

A regeneration system 200 illustrated in FIG. 1 is mounted on a vehicle having an idling stop function and a deceleration regeneration function. The regeneration system 200 includes the power supply 101, a capacitor 11, a battery 12, a generator 13, a large current load 4, a load 5, a protected load 6, a higher electronic control unit (ECU) 7, and an ignition switch (IG-SW) 8.

The capacitor 11 is constituted of an electric double-layer capacitor and is an example of "electric storage" of one or more embodiments of the invention. Other than this, for example, the electric storage may be constituted of a lithium ion battery, a lithium ion capacitor, or a nickel-hydrogen rechargeable battery, and the like.

The battery 12 is constituted of a conventional lead battery and is an example of "DC power supply" of one or more embodiments of the invention. The DC power supply may be constituted of another battery or battery cells.

The generator 13 is driven by an engine (not illustrated) of a vehicle and generates power. For example, if a voltage of the battery 12 is lowered when the vehicle usually runs, power is generated by driving the generator 13 by a driving force of the engine. Furthermore, the vehicle continuously runs even when the vehicle is decelerated or the vehicle performs a braking operation, and the engine rotates even though fuel is not being supplied to the engine. Thus, the generator 13 is driven by using the rotational force of the engine and power is generated. Power that is generated by the generator 13 when the vehicle is decelerated is referred to as regenerative power. The capacitor 11 stores power generated by the generator 13.

In addition, the supply of fuel to the engine is stopped when the vehicle is decelerated. That is, since power is generated without consuming fuel, the fuel consumption rate of the vehicle is improved. Moreover, if the voltage of the battery 12 is sufficient when the vehicle usually runs, power is not generated by the generator 13.

The large current load 4 is constituted of an electric motor through which a large current flows when the electric motor is actuated. The large current load 4 includes a starter motor 4a for starting the engine. As another example, the large current load 4 also includes a motor for power steering (not illustrated), an electric brake, and the like.

The load 5 is constituted of electrical components and the like which may not be used when the vehicle performs the idling stop. For example, the load 5 includes an electric seat heater and the like. The large current load 4 and the load 5 constitute "first load" of one or more embodiments of the invention.

The protected load 6 is constituted of electrical components and the like that require supplied power even when the vehicle performs the idling stop and are required to be protected so as not to lower a supply voltage when the engine is restarted (when the starter motor 4a is actuated) after the idling stop. For example, the protected load 6 includes navigation, audio, air conditioner, a meter, transmission, a safety device, and the like. The protected load 6 constitutes "second load" of one or more embodiments of the invention.

The upper ECU 7 is connected to the power supply 101 by, for example, a Controller Area Network (CAN). The upper ECU 7 transmits information indicating a state of the vehicle, operation instructions, and the like to the power supply 101.

One end of the IG-SW 8 is connected to a positive electrode of the battery 12. The other end of the IG-SW 8 is connected to the power supply 101. A negative electrode of the battery 12 is connected to a ground. The large current load 4, the generator 13, the load 5, and the upper ECU 7 are connected in parallel to the battery 12.

The power supply 101 includes power paths L1 to L3, connection terminals C1 to C3, a DC-DC converter 9, and a controller 10.

The positive electrode of the battery 12 is connected to the first connection terminal C1. The capacitor 11 is connected to the second connection terminal C2. The protected load 6 is connected to the third connection terminal C3. Moreover, other white circles on a frame of one-dotted chain line indicating the power supply 101 of FIG. 1 also illustrate connection terminals (no reference numerals and hereinafter, the same is applied to each view).

The DC-DC converter 9 includes two input/output terminals T1 and T2, and has a bidirectionally boosted or stepped-down function of four quadrants. The controller 10 is constituted of a CPU and a memory, and controls an operation of the DC-DC converter 9. Furthermore, the controller 10 communicates with the upper ECU 7. Particularly, the controller 10 receives information indicating the state of the vehicle or the operation instruction from the upper ECU 7. Moreover, in FIG. 1, wiring of the control system or wiring of the communication system in the power supply 101 are not illustrated (hereinafter, the same is applied to each view).

One end of the first power path L1 is connected to the first connection terminal C1 and the other end of the first power path L1 is connected to the first input/output terminal T1 of the DC-DC converter 9. One end of the second power path L2 is connected to the second connection terminal C2 and the other end of the second power path L2 is connected to the second input/output terminal T2 of the DC-DC converter 9. One end of the third power path L3 is connected to the third connection terminal C3 and the other end of the third power path L3 is connected to the second power path L2.

Figure 2:
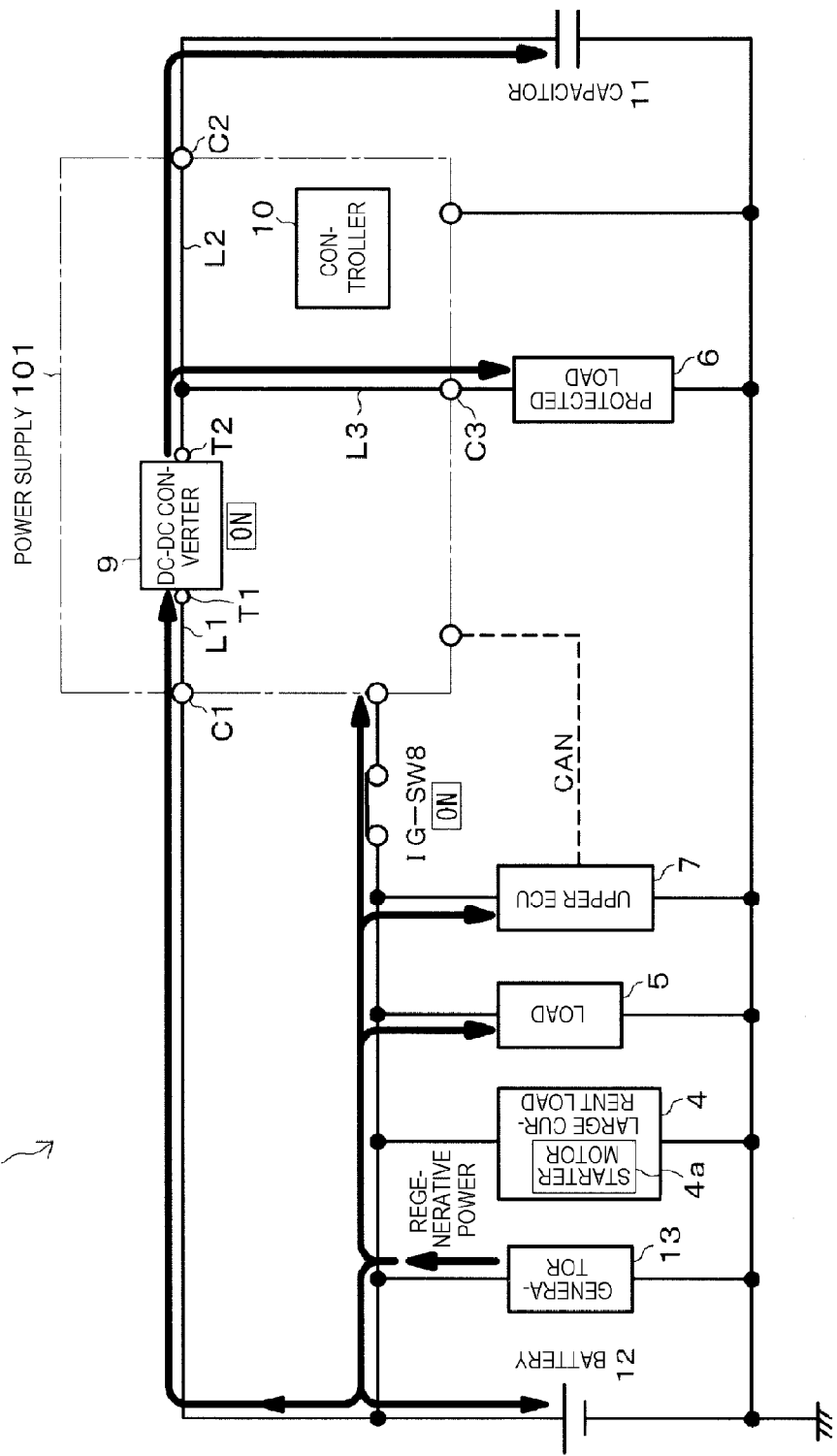
FIG. 2 is a diagram illustrating an operation of a circuit of FIG. 1 when regenerative power is generated.
Figure 3:
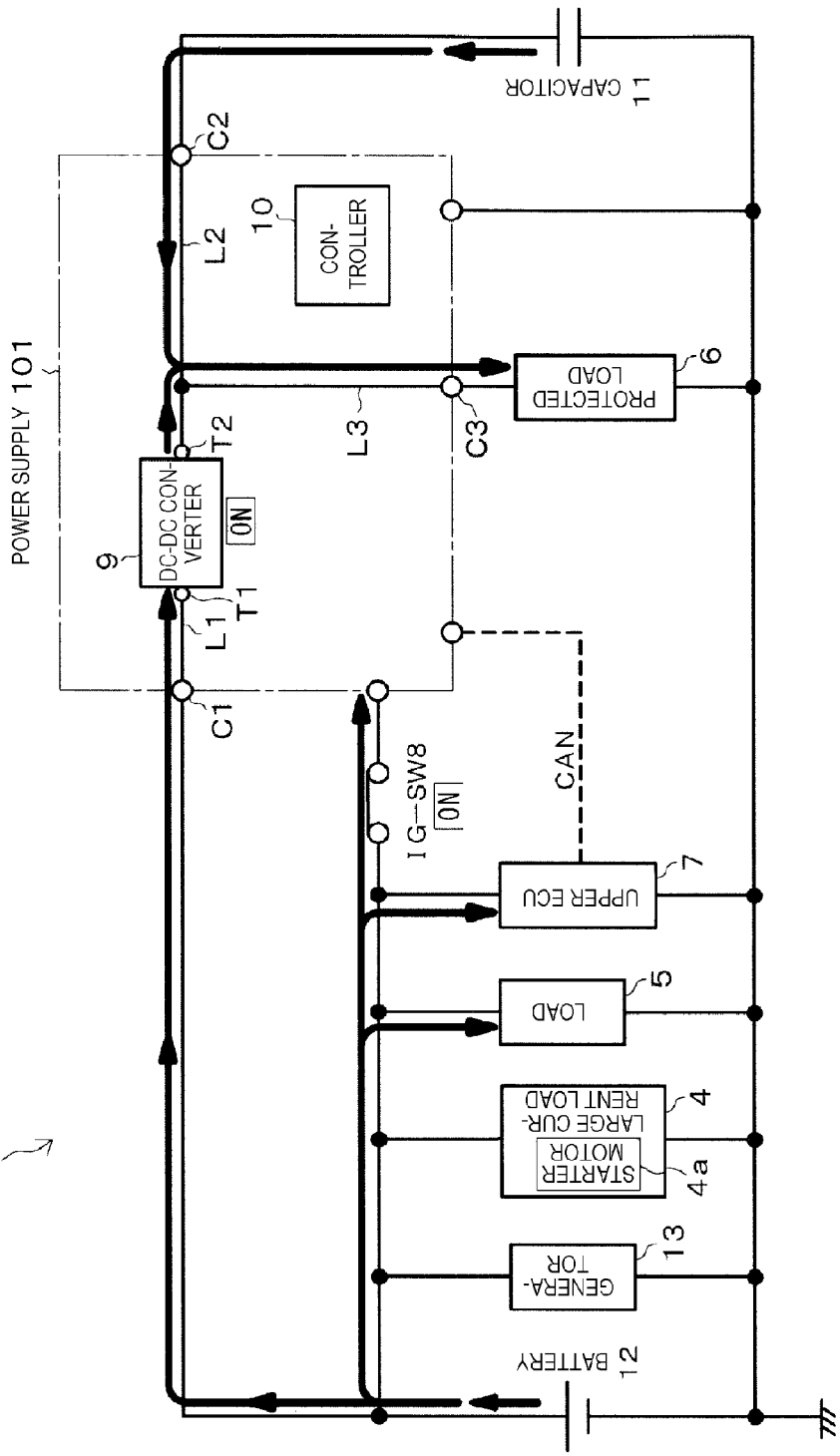
FIG. 3 is a diagram illustrating the operation of the circuit of FIG. 1 when power is not generated and a starter motor is not actuated.
Figure 4:
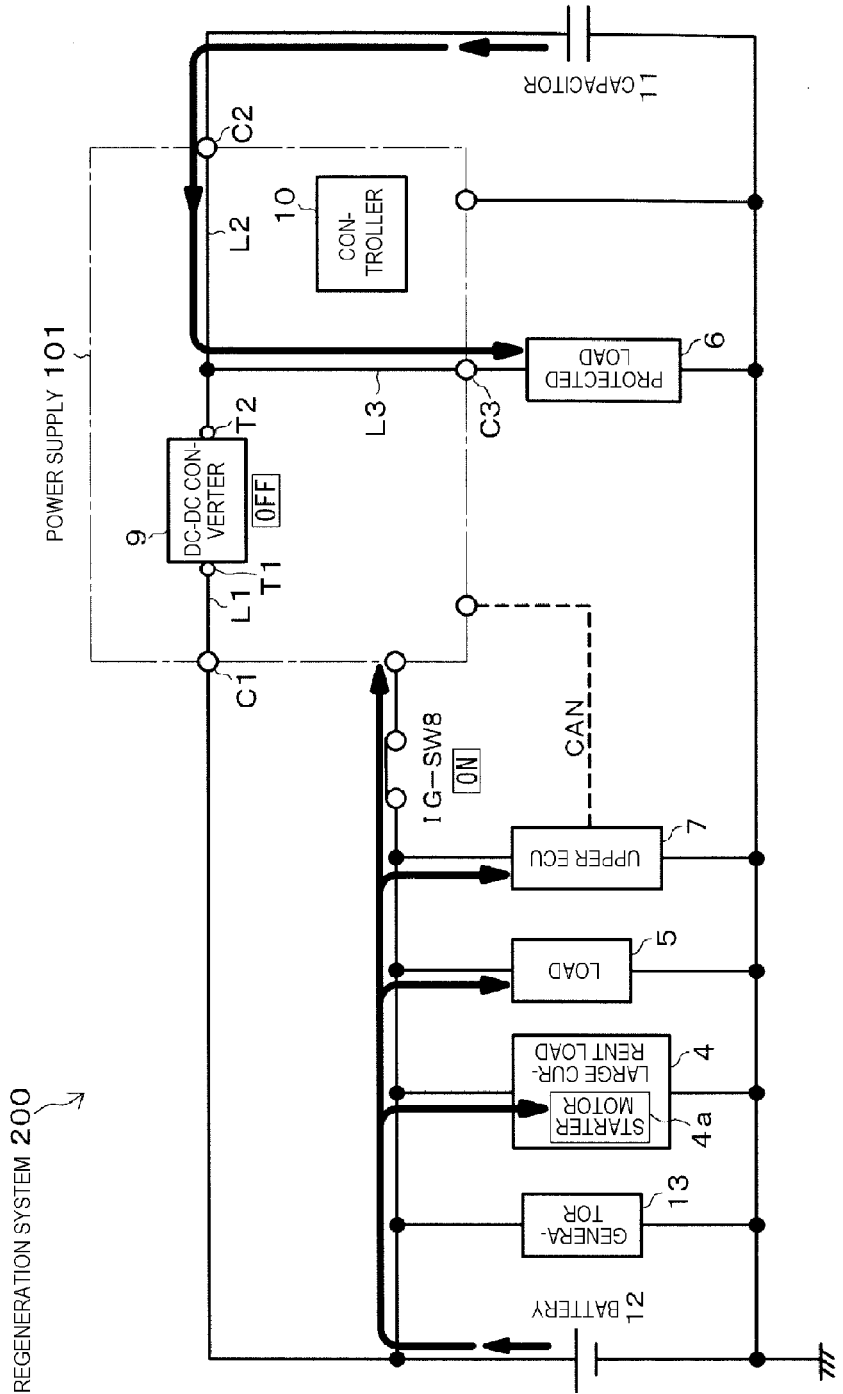
FIG. 4 is a diagram illustrating the operation of the circuit of FIG. 1 when the starter motor is actuated after an idling stop.

Next, flow of power in the power supply 101 and peripheral portions of the power supply 101 will be described with reference to FIGS. 2 to 4.

If the vehicle runs in a state where the IG-SW 8 is turned on, the generator 13 generates the regenerative power when the vehicle is decelerated by a driver releasing an accelerator pedal or pressing a brake pedal. As indicated by arrows illustrated in FIG. 2, the regenerative power is supplied from the generator 13 to the load 5, the upper ECU 7, the battery 12, and the power supply 101. In this case, if the voltage of the battery 12 is lowered, the battery 12 is charged by the regenerative power.

In addition, in the power supply 101, the regenerative power is led to the DC-DC converter 9 through the first connection terminal C1 and the first power path L1. The controller 10 converts (stepped up or down) the voltage of the regenerative power into a voltage corresponding to the capacitor 11 by the DC-DC converter 9 and outputs power to the second power path L2. The power is stored in the capacitor 11 from the second power path L2 through the second connection terminal C2. That is, the capacitor 11 is charged by the regenerative power. Furthermore, power output from the DC-DC converter 9 to the second power path L2 is also supplied to the protected load 6 through the third power path L3 and the third connection terminal C3.

In the vehicle which is in a state other than the idling stop, actuation of the starter motor 4a is also not performed if the generator 13 does not generate power. For example, this is a case where the voltage of the battery 12 and the capacitor 11 is sufficiently high. In this case, as indicated by arrows illustrated in FIG. 3, power of the battery 12 is supplied to the load 5, the upper ECU 7, and the power supply 101. Then, in the power supply 101, power from the battery 12 is supplied to the protected load 6 through the first connection terminal C1, the first power path L1, the DC-DC converter 9, the third power path L3, and the third connection terminal C3. Furthermore, power of the capacitor 11 is supplied to the protected load 6 through the second connection terminal C2, the second power path L2, the third power path L3, and the third connection terminal C3. That is, the capacitor 11 is discharged.

If the vehicle is in a state of running at an extremely low speed or of being stopped and a predetermined idling stop transition condition is satisfied, the idling stop is started. As the idling stop transition condition at this time, for example, power that can be supplied to the protected load 6 when the engine is restarted remains in the capacitor 11. Determination of satisfaction of the idling stop transition condition or control of the idling stop is performed by the upper ECU 7.

Thereafter, when the idling stop is completed and the starter motor 4a is actuated to restart the engine, the controller 10 of the power supply 101 stops (turns off) the DC-DC converter 9. Thus, as illustrated in FIG. 4, power of the battery 12 is not supplied to the protected load 6 through the DC-DC converter 9. However, power of the capacitor 11 is supplied to the protected load 6 through the second connection terminal C2, the second power path L2, the third power path L3, and the third connection terminal C3.

Furthermore, the starter motor 4a is actuated by power of the battery 12. Even if a large current flows through the starter motor 4*a* from the battery 12 when actuating the starter motor 4*a* (except for an initial actuation), the DC-DC converter 9 is stopped and power is supplied from the capacitor 11 to the protected load 6. Thus, the protected load 6 is stably and continuously driven without lowering the supply voltage to the protected load 6.

According to the first embodiment described above, the protected load 6 is connected to the second power path L2 between the DC-DC converter 9 of the power supply 101 and the capacitor 11 through the third power path L3. Thus, power of the battery 12 is directly supplied to the load 5 or the large current load 4 and power of the battery 12 can be supplied to the protected load 6 through the first power path L1, the DC-DC converter 9, and the third power path L3. Furthermore, the regenerative power generated by the generator 13 is supplied to the capacitor 11 through the first power path L1, the DC-DC converter 9, and the second power path L2, and the capacitor 11 can be charged. Furthermore, power of the capacitor 11 can be supplied to the protected load 6 through the second power path L2 and the third power path L3 when actuating the starter motor 4*a*. Thus, power can be stably supplied to the loads 4, 5, and 6, and the regenerative power can be effectively used.

Figure 5:
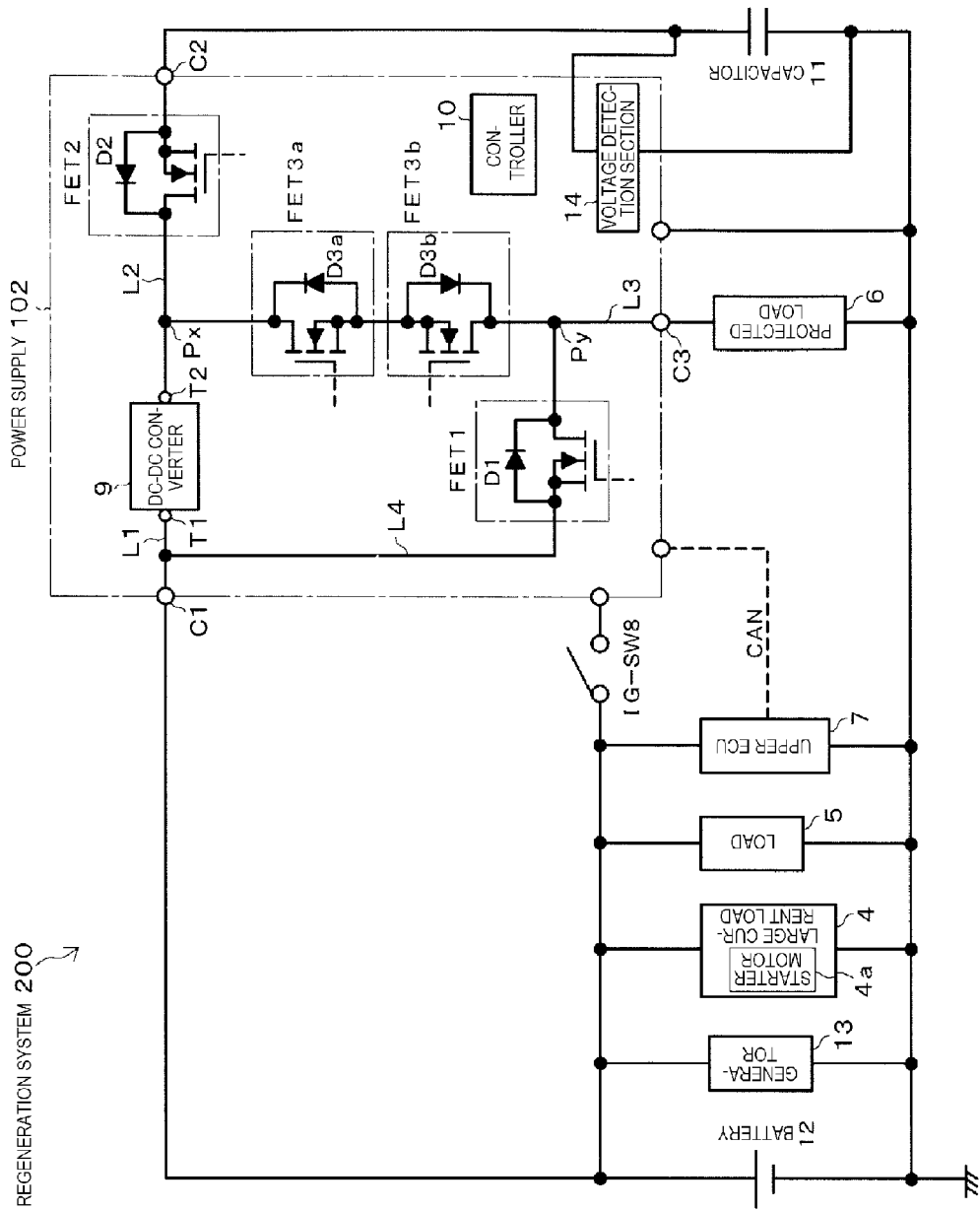
FIG. 5 is a diagram illustrating a circuit configuration of the power supply of a second embodiment of the invention.

Next, a circuit configuration of a power supply 102 of a second embodiment will be described with reference to FIG. 5.

The power supply 102 includes a fourth power path L4, a field effect transistor (FET) 1, an FET 2, an FET 3*a*, an FET 3*b*, and a voltage detector 14 in addition to the configuration elements L1 to L3, C1 to C3, 9, and 10 described above.

One end of the fourth power path L4 is connected to the first power path L1 and the other end of the fourth power path L4 is connected to the third power path L3.

The FET 1, the FET 2, the FET 3*a*, and the FET 3*b* are constituted of an N-channel type Metal Oxide Semiconductor Field Effect Transistor (MOSFET).

The FET 1 is provided on the fourth power path L4. A drain of the FET 1 is connected to the third power path L3 and the protected load 6, and a source of the FET 1 is connected to the first power path L1. A diode D1 that is connected in parallel to the FET 1 is a parasitic diode of the FET 1. An anode of the diode D1 is connected to the first power path L1 and a cathode of the diode D1 is connected to the third power path L3 and the protected load 6. Thus, the diode D1 makes the current flow from the first power path L1 side to the third power path L3 side. The FET 1 is an example of "first switching element" of one or more embodiments of the invention. The diode D1 is an example of "rectifier" of one or more embodiments of the invention.

The FET 2 is provided between a connection point Px to the third power path L3 on the second power path L2 and the second connection terminal C2. A drain of the FET 2 is connected to the third power path L3 and the second input/output terminal T2 of the DC-DC converter 9, and a source of the FET 2 is connected to the second connection terminal C2. A diode D2 that is connected in parallel to the FET 2 is a parasitic diode of the FET 2. An anode of the diode D2 is connected to the second connection terminal C2 and a cathode of the diode D2 is connected to the third power path L3 and the second input/output terminal T2 of the DC-DC converter 9. The FET 2 is an example of "second switching element" of one or more embodiments of the invention.

The FET 3*a* and the FET 3*b* are connected in series to a portion between a connection point Py to the fourth power path L4 on the third power path L3 and the connection point Px to the second power path L2. A drain of the FET 3*a* is connected to the second power path L2. A source of the FET 3*a* is connected to a source of the FET 3*b*. A drain of the FET 3*b* is connected to the fourth power path L4 and the protected load 6.

A diode D3*a* that is connected in parallel to the FET 3*a* is a parasitic diode of the FET 3*a*. A diode D3*b* that is connected in parallel to the FET 3*b* is a parasitic diode of the FET 3*b*. A cathode of the diode D3*a* is connected to the second power path L2. An anode of the diode D3*a* is connected to an anode of the diode D3*b*. A cathode of the diode D3*b* is connected to the fourth power path L4 and the protected load 6. That is, a direction of the diode D3*a* is opposite to a direction of the diode D3*b*. The FETs 3*a* and 3*b* are an example of "third switching element" of one or more embodiments of the invention.

A gate (not illustrated and hereinafter, the same is applied to each view) of each of the FETs 1, 2, 3*a*, and 3*b* is connected to the controller 10. The controller 10 inputs a driving signal to the gate of each of the FETs 1, 2, 3*a*, and 3*b* and controls an on/off operation of each of the FETs 1, 2, 3*a*, and 3*b*.

The voltage detector 14 detects the voltage of the capacitor 11. The controller 10 calculates a charging amount of the capacitor 11 based on a detected voltage of the voltage detector 14.

Next, flow of power of the power supply 102 and a peripheral portion of the power supply 102 will be described with reference to FIGS. 6 to 12.

When the IG-SW 8 is turned off, the vehicle is in a state of being stopped and the regeneration system 200 is in a state of standby. In this case, since the current is required to flow through the upper ECU 7 or the loads 5 and 6 such that they can be operated, as indicated by arrows illustrated in FIG. 6, power of the battery 12 is supplied to the load 5, the upper ECU 7, and the power supply 102.

In the power supply 102, the DC-DC converter 9 is in a state of being stopped (off) and the FETs 1, 2, 3*a*, and 3*b* are in a state of being turned off when the regeneration system 200 is in standby state. Thus, power supplied from the battery 12 to the first connection terminal C1 of the power supply 102 is supplied to the protected load 6 through the first power path L1, the fourth power path L4, the diode D1 of the FET 1, the third power path L3, and the third connection terminal C3.

Then, the IG-SW 8 is turned on by an operation of a driver, and since the engine is initially actuated, the starter motor 4*a* is also initially actuated. In this case, as indicated in arrows illustrated in FIG. 7, the starter motor 4*a* is actuated by power of the battery 12. Furthermore, in the power supply 102, the controller 10 turns on only the FET 1 while the DC-DC converter 9 is stopped. Thus, power of the battery 12 is supplied from the first connection terminal C1 to the protected load 6 through the first power path L1, the fourth power path L4, the FET 1, the third power path L3, and the third connection terminal C3.

If the vehicle initially runs by the operation of the driver after the engine is actuated, power is generated by the generator 13. As indicated by arrows illustrated in FIG. 8, power generated by the generator 13 is supplied to the load 5, the upper ECU 7, and the power supply 102.

In the power supply 102, when the vehicle initially runs, the DC-DC converter 9 is in a state of being stopped and only the FET 1 is in a state of being turned on. Thus, power from the generator 13 is supplied from the first connection terminal C1 to the protected load 6 through the first power path L1, the fourth power path L4, the FET 1, the third power path L3, and the third connection terminal C3.

If the vehicle is decelerated during running, the generator 13 generates the regenerative power. As indicated by arrows illustrated in FIG. 9, the regenerative power generated by the generator 13 is supplied to the load 5, the upper ECU 7, the battery 12, and the power supply 102. In this case, if the voltage of the battery 12 is lowered, the battery 12 is charged by the regenerative power.

When the regenerative power is generated, in the power supply 102, the controller 10 turns on only the FET 1 and the FET 2. Thus, the regenerative power is supplied from the first connection terminal C1 to the protected load 6 through the first power path L1, the fourth power path L4, the FET 1, the third power path L3, and the third connection terminal C3. In addition, the controller 10 converts the voltage of the regenerative power input from the first connection terminal C1 through the first power path L1 into a voltage corresponding to the capacitor 11 by the DC-DC converter 9 and then outputs power to the second power path L2. Power is stored in the capacitor 11 from the second power path L2 through the FET 2 and the second connection terminal C2. That is, the capacitor 11 is charged by the regenerative power.

Figure 10:
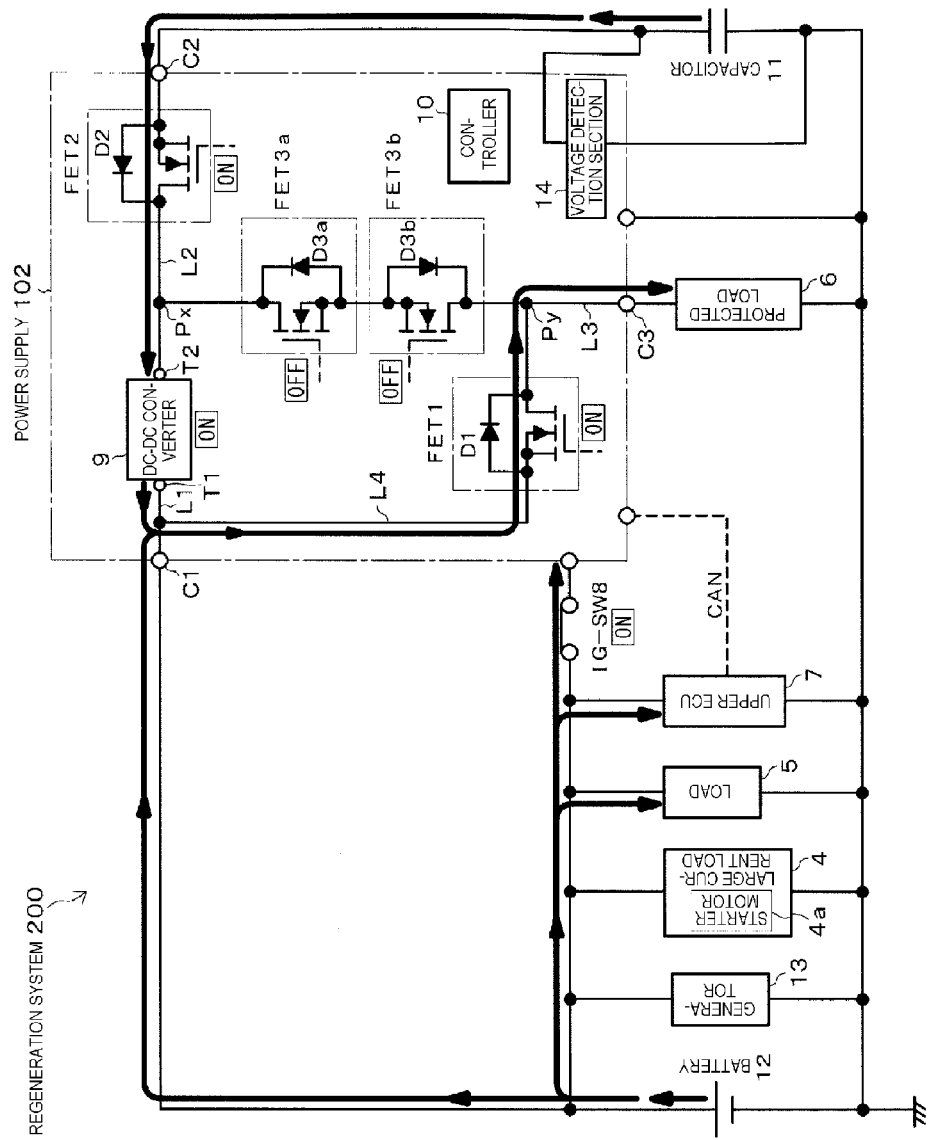
FIG. 10 is a diagram illustrating the operation of the circuit of FIG. 5 when power is not generated and the starter motor is not actuated.

When the generator 13 does not generate power and the starter motor 4a is not actuated, as indicated by arrows illustrated in FIG. 10, power of the battery 12 is supplied to the load 5, the upper ECU 7, and the power supply 102. In this case, in the power supply 102, the controller 10 turns on the FET 1. Thus, power from the battery 12 is supplied to the protected load 6 through the first connection terminal C1, the first power path L1, the fourth power path L4, the FET 1, and the third power path L3.

Furthermore, as illustrated in FIG. 10, the controller 10 turns off the FETs 3a and 3b, and turns on the FET 2. Then, the controller 10 converts the voltage input from the capacitor 11 through the second connection terminal C2, the second power path L2, and the FET 2 into the voltage corresponding to the protected load 6 by the DC-DC converter 9, and thereby the capacitor 11 outputs power to the first power path L1. The power is supplied from the first power path L1 to the protected load 6 through the fourth power path L4, the FET 1, the third power path L3, and the third connection terminal C3. That is, the capacitor 11 is discharged.

If the vehicle is in a state of extremely slow running or a state of being stopped and then a predetermined idling stop transition condition is satisfied, the idling stop is started. As the idling stop transition condition at this time, for example, power that can be supplied to the protected load 6 when restarting the engine can remain in the capacitor 11 or the battery 12.

Figure 11:
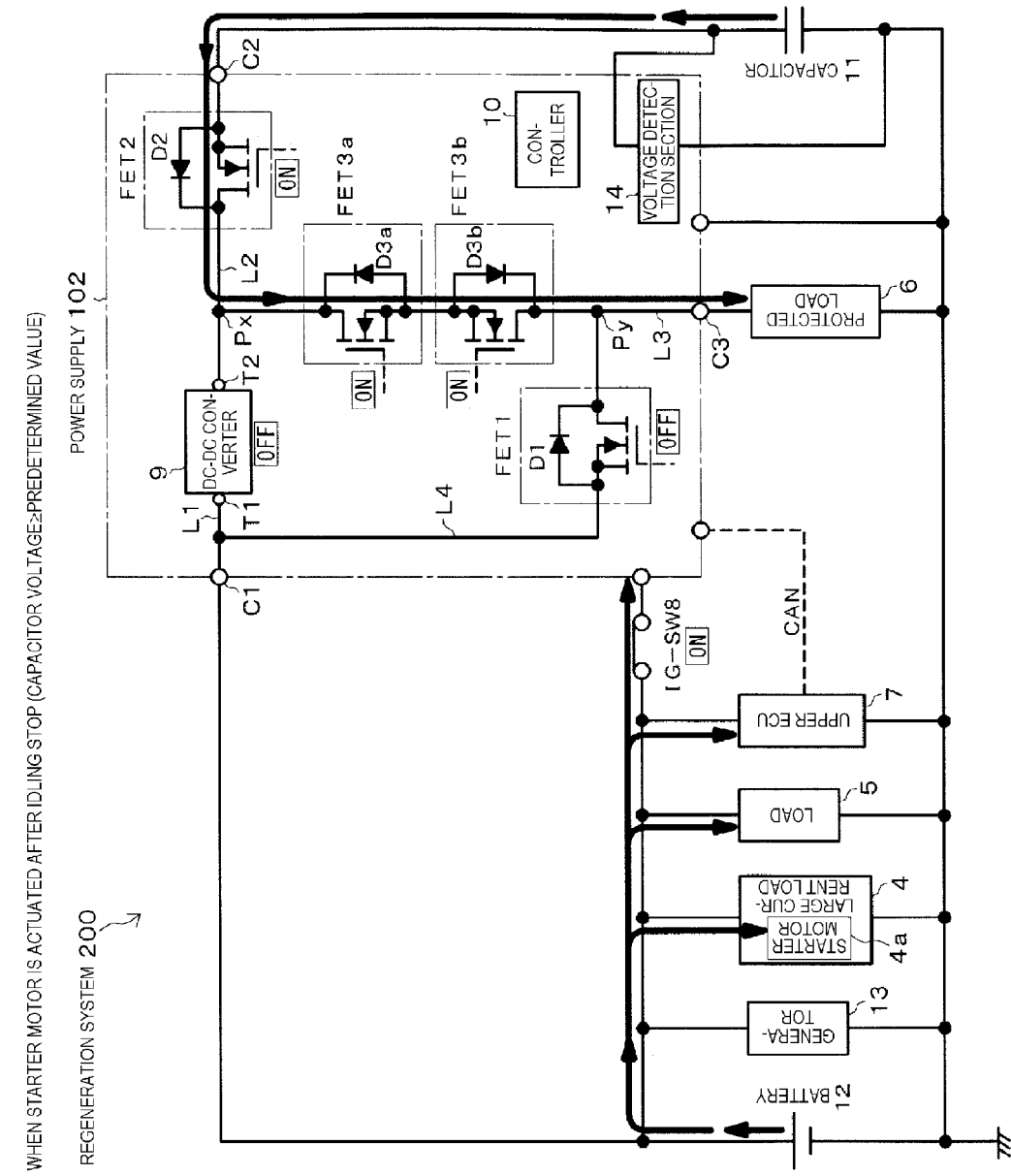
FIG. 11 is a diagram illustrating the operation of the circuit of FIG. 5 when the starter motor is actuated after the idling stop and a voltage of an electric storage is a predetermined value or greater.

Thereafter, when the idling stop is completed and the starter motor 4a is actuated to restart the engine, the controller 10 detects the voltage of the capacitor 11 by the voltage detector 14. In this case, if the voltage of the capacitor 11 detected by the voltage detector 14 is a predetermined value or greater that is required to drive the protected load 6, as illustrated in FIG. 11, the controller 10 stops driving of the DC-DC converter 9 and turns off the FET 1 and turns on the FET 2, and the FETs 3a and 3b. Thus, as indicated by arrows illustrated in FIG. 11, power from the capacitor 11 is supplied to the protected load 6 through the second connection terminal C2, the second power path L2, the FET 2, the third power path L3, the FETs 3a and 3b, and the third connection terminal C3. In addition, since the FET 1 or the DC-DC converter 9 is turned off, the battery 12 and the protected load 6 are electrically separated.

Thus, when the starter motor 4a is actuated (excluding initial actuation), even if a large current flows through the starter motor 4a from the battery 12, the protected load 6 is stably and continuously driven without lowering the supply voltage from the capacitor 11 to the protected load 6.

Figure 12:
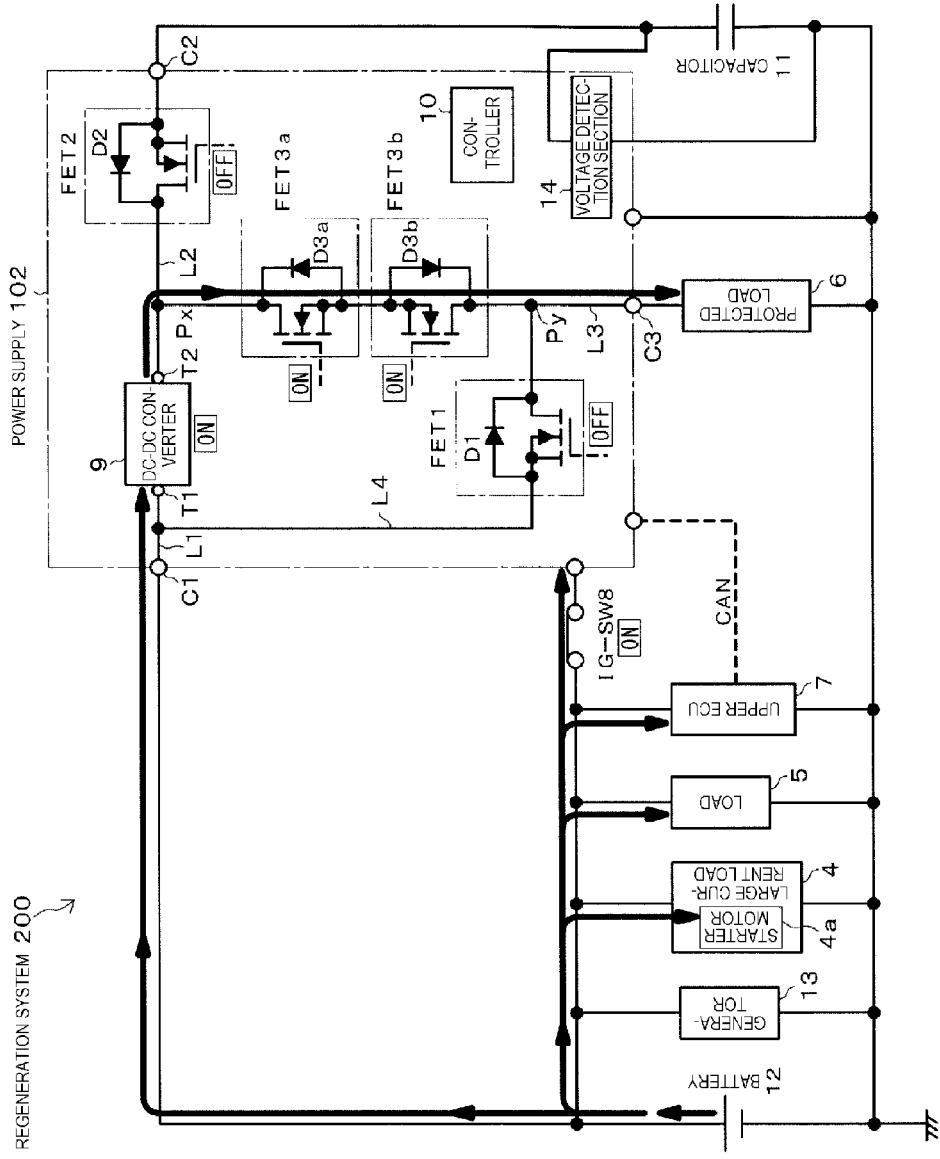
FIG. 12 is a diagram illustrating the operation of the circuit of FIG. 5 when the starter motor is actuated after the idling stop and the voltage of the electric storage is less than a predetermined value.

Meanwhile, when the starter motor 4a is actuated, if the voltage of the capacitor 11 detected by the voltage detector 14 is less than a predetermined value, as illustrated in FIG. 12, the controller 10 turns off the FETs 1 and 2. Thus, the capacitor 11 is electrically separated from the protected load 6, the battery 12, and the like by the FET 2, and the fourth power path L4 is electrically disconnected by the FET 1.

In addition, as illustrated in FIG. 12, the controller 10 turns on the FETs 3a and 3b, and converts the voltage input from the battery 12 through the first connection terminal C1 and the first power path L1 into the voltage corresponding to the protected load 6 by the DC-DC converter 9, and outputs power to the second power path L2. The power is supplied from the second power path L2 to the protected load 6 through the third power path L3, the FETs 3a and 3b, the third power path L3, and the third connection terminal C3. That is, power from the battery 12 is supplied to the protected load 6 through the DC-DC converter 9.

When the starter motor 4a is actuated, even if a large current flows through the starter motor 4a from the battery 12, since corresponding power from the DC-DC converter 9 is supplied to the protected load 6, the protected load 6 is continuously driven.

Even when the vehicle performs the idling stop, as illustrated in FIGS. 11 and 12, power of the capacitor 11 or the battery 12 may be supplied to the protected load 6 based on a comparison result between the voltage of the capacitor 11 and a predetermined value.

According to the second embodiment described above, power of the battery 12 is directly supplied to the load 5 or the large current load 4 and power of the battery 12 can be supplied to the protected load 6 through the power paths L1 to L4, the FETs 1, 2, 3a, and 3b, or the DC-DC converter 9. Furthermore, the regenerative power generated by the generator 13 can be stored in the capacitor 11 through the power paths L1 and L2, the DC-DC converter 9, or the FET 2. Furthermore, power of the capacitor 11 can be supplied to the protected load 6 through the power paths L1 to L4, the FETs 1, 2, 3a, and 3b, or the DC-DC converter 9. Thus, it is possible to stably supply power to the loads 4, 5, and 6, and to effectively use the regenerative power.

Figure 6:
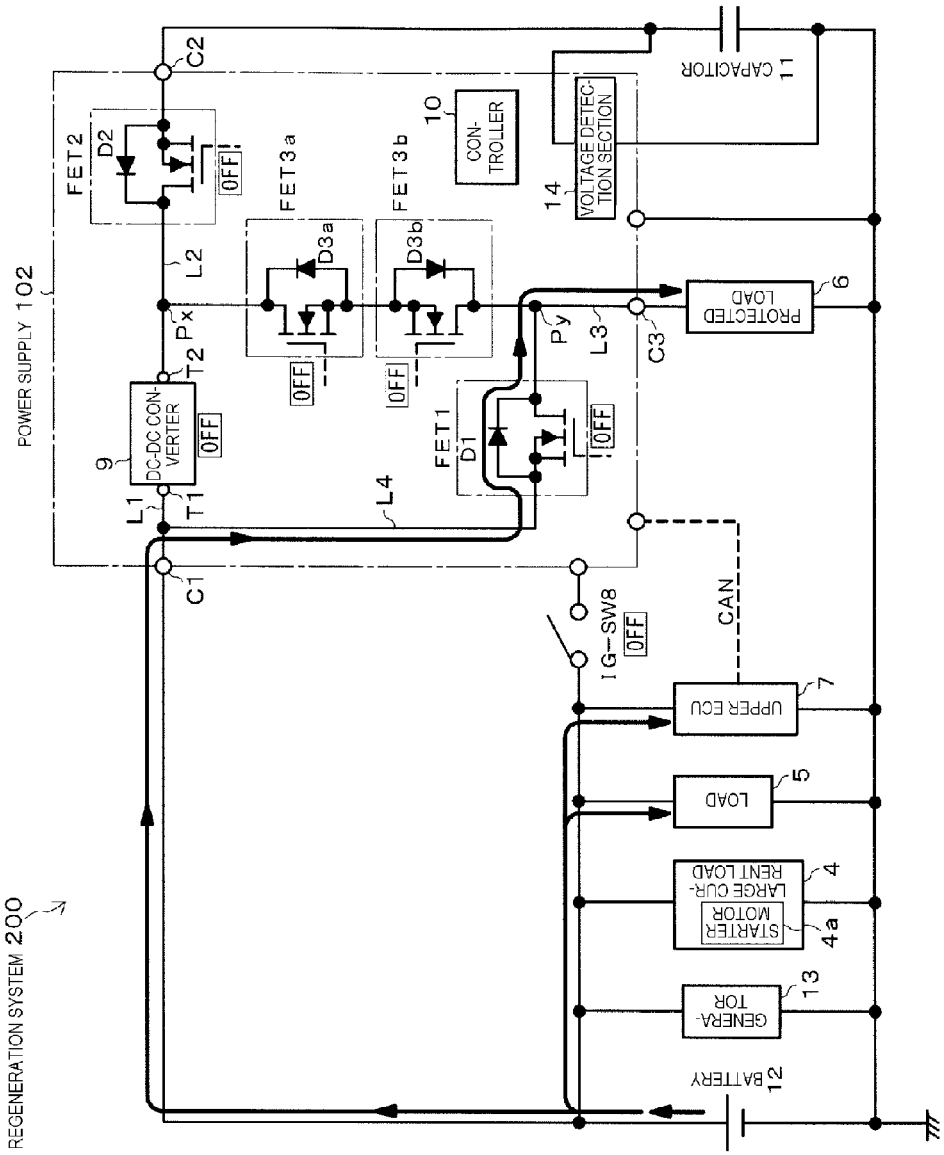
FIG. 6 is a diagram illustrating an operation of a circuit of FIG. 5 when a regeneration system is in standby state.
Figure 7:
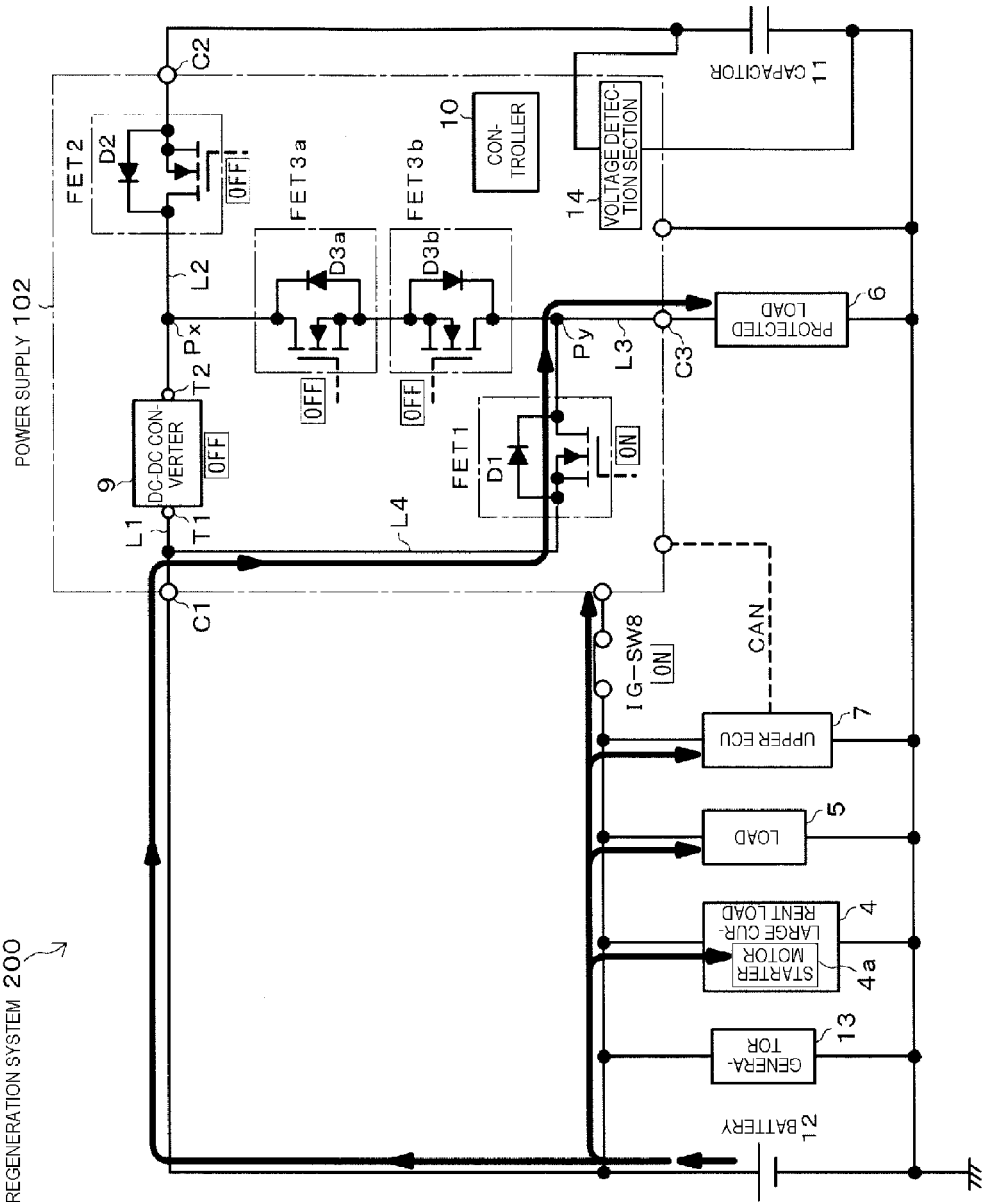
FIG. 7 is a diagram illustrating the operation of the circuit of FIG. 5 when the starter motor is initially actuated.
Figure 8:
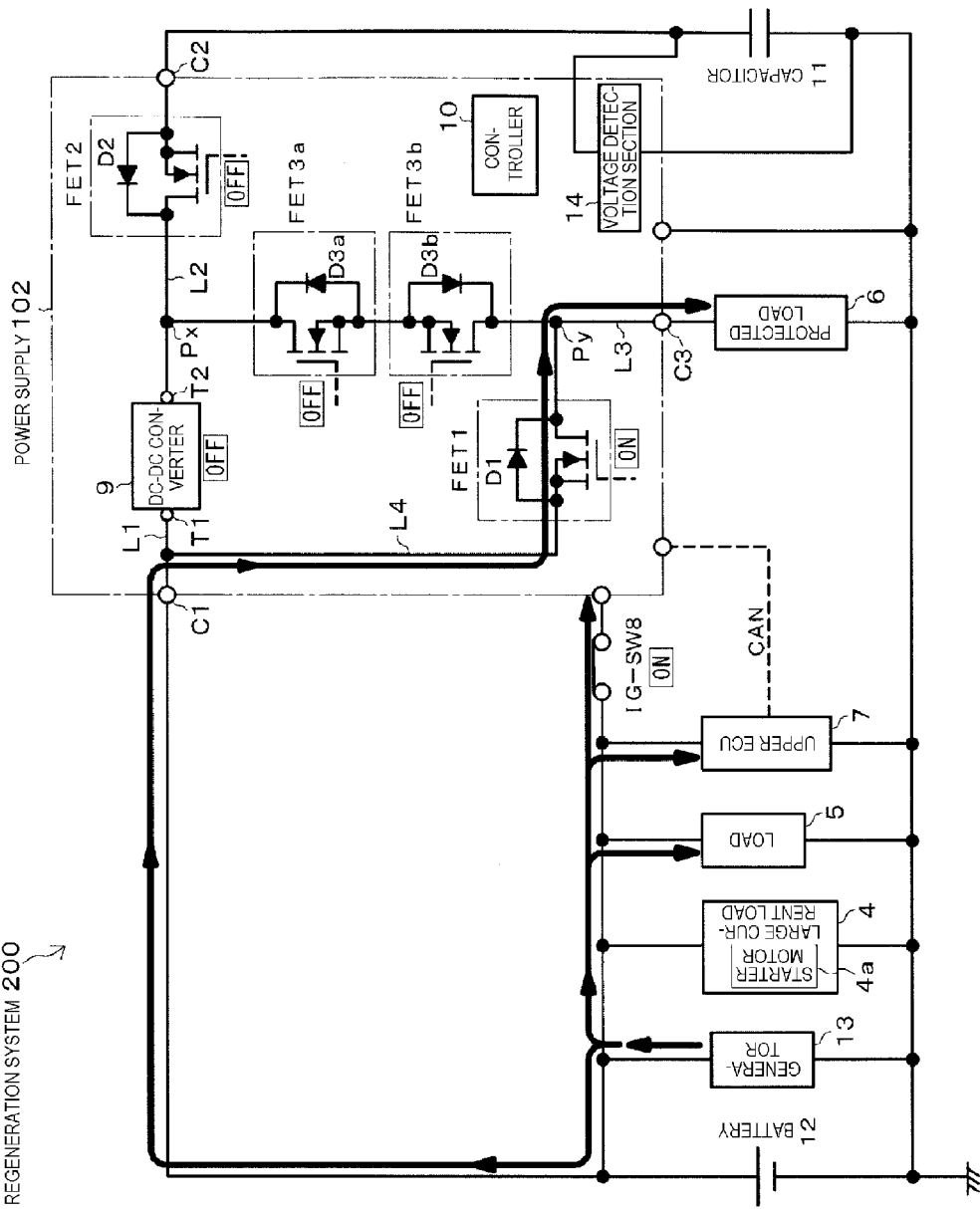
FIG. 8 is a diagram illustrating the operation of the circuit of FIG. 5 when a vehicle initially runs.
Figure 9:
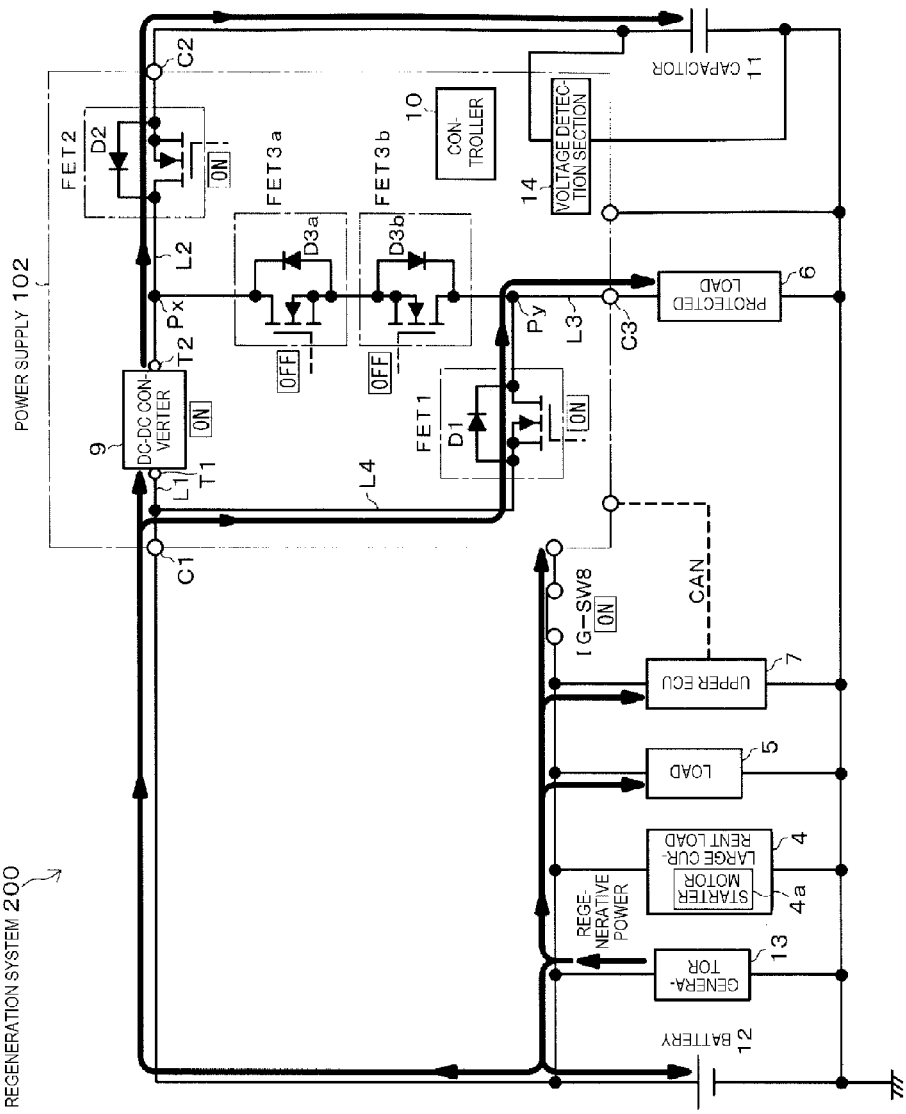
FIG. 9 is a diagram illustrating the operation of the circuit of FIG. 5 when regenerative power is generated.

In addition, in the second embodiment described above, the fourth power path L4 is provided and the FET 1 to which the diode D1 is connected in parallel is provided in the fourth power path L4 so as to bypass the first power path L1 and the third power path L3. Thus, power of the battery 12 or the regenerative power of the generator 13 can be supplied to the protected load 6 without passing through the DC-DC converter 9 by turning on the FET 1 (FIGS. 7 and 9). In addition, since the anode of the diode D1 is connected to the first power path L1 and the cathode is connected to the third power path L3, even if the DC-DC converter 9 is in a state of being stopped and the FET 1 is in a state of being turned off during standby, power of the battery 12 can be supplied to the protected load 6 through the diode D1 of the FET 1 (FIG. 6). In addition, power of the capacitor 11 can be supplied to the protected load 6 through the DC-DC converter 9 by turning on the FET 2 and the FET 1 (FIG. 10). Furthermore, for example, power supplied from the third power path L3 to the protected load 6 can be prevented from being drawn from the fourth power path L4 to the battery 12 side by turning off the FET 1 when actuating the starter motor 4a (FIG. 11).

Furthermore, in the second embodiment described above, the FET 2 to which the diode D2 is connected in parallel is provided in the second power path L2. Thus, the capacitor 11 can be discharged or the capacitor 11 can be charged by the regenerative power by turning on the FET 2 and by driving the DC-DC converter 9 (FIGS. 9 and 10). Since the cathode of the diode D2 is connected to the third power path L3, the capacitor 11 is electrically separated from the loads 4 to 6 or the battery 12 and the capacitor 11 can be prevented from being unintentionally charged or discharged by turning off the FET 2. Particularly, as illustrated in FIG. 12, even if the voltage of the capacitor 11 is low when actuating the starter motor 4a, the capacitor 11 is prevented from being charged by power from the battery 12 and power from the battery 12 can be reliably supplied to the protected load 6 by turning off the FET 2. Furthermore, it is possible to prevent the flow of an inrush current from the battery 12 or the generator 13 to the capacitor 11 through the DC-DC converter 9 by the FET 2 and the diode D2.

Furthermore, in the second embodiment described above, the FETs 3a and 3b are connected in series to the third power path L3 such that the directions of the parasitic diodes D3a and D3b are opposite to each other. Thus, power of the capacitor 11 can be supplied to the protected load 6 without passing through the DC-DC converter 9 by turning on the FET 2 and the FETs 3a and 3b (FIG. 11). Furthermore, power of the battery 12 can be supplied to the protected load 6 through the DC-DC converter 9 by turning on only the FETs 3a and 3b (FIG. 12). Furthermore, it is possible to prevent the flow of the inrush current from the battery 12 or the generator 13 to the capacitor 11 through the diode D1 of the FET 1 by the FETs 3a and 3b, and the diode D3b by turning off the FETs 3a and 3b.

Furthermore, when the regenerative power is generated by the generator 13, even if the voltage of the capacitor 11 is lower than the voltage of the battery 12, it is possible to supply the regenerative power only to the capacitor 11 by turning on the FET 2 and by turning off the FETs 3a and 3b without supplying the regenerative power from the DC-DC converter 9 to the protected load 6. Conversely, even if the voltage of the capacitor 11 is higher than the voltage of the battery 12, power of the capacitor 11 can be prevented from being discharged through the third power path L3. As a result, it is possible to charge the capacitor 11 by the regenerative power and to increase charging efficiency without depending on a size of the voltage of the battery 12 and the capacitor 11. Furthermore, in order to boost the regenerative power by the DC-DC converter 9, a large current may not flow through the DC-DC converter 9 and the DC-DC converter 9 having a high rated current is not required to be used.

Furthermore, in the second embodiment described above, the FETs 1, 3a, and 3b are provided in parallel to the DC-DC converter 9 and the FET 2 is provided on the capacitor 11 side of the DC-DC converter 9. Thus, it is possible to reduce a size of the power supply 102 by using the small FETs 1, 2, 3a, and 3b without using a large switching element.

Furthermore, in the second embodiment described above, when actuating the starter motor 4a after the idling stop, if the voltage of the capacitor 11 is a predetermined value or greater, only the FET 2 and the FETs 3a and 3b are turned on and power of the capacitor 11 is supplied to the protected load 6 (FIG. 11). Meanwhile, if the voltage of the capacitor 11 is less than a predetermined value, only the FETs 3a and 3b are turned on, driving of the DC-DC converter 9 is controlled, and power of the battery 12 is supplied to the protected load 6 (FIG. 12). Thus, it is not necessary to leave power (charge) in the capacitor 11 in preparation for the actuation of the starter motor 4a, power of the capacitor 11 is used up, and thereby it is possible to increase utilization efficiency of the capacitor 11. Furthermore, even if power of the capacitor 11 is used up, since power of the battery 12 is supplied to the protected load 6 through the DC-DC converter 9 when actuating the starter motor 4a, it is possible to drive the protected load 6. As a result, even if power does not remain in the capacitor 11, it is possible to perform the idling stop and improve the fuel consumption rate.

Furthermore, in the second embodiment described above, when the regenerative power is generated by the generator 13, the regenerative power is supplied to the load 5, the FET 1 is turned on, the regenerative power is supplied to the protected load 6, and thereby it is possible to drive each of the loads 5 and 6 by the regenerative power (FIG. 9). In addition, since the FET 2 is turned on and the regenerative power is supplied to the capacitor 11 through the DC-DC converter 9, it is possible to charge the capacitor 11 by the regenerative power (FIG. 9).

Furthermore, in the second embodiment described above, when no power is generated other than when the starter motor 4a is actuated, the FETs 1 and 2 are turned on and driving of the DC-DC converter 9 is controlled so as to discharge the capacitor 11 (FIG. 10). Thus, power of the battery 12 or power of the capacitor 11 is supplied to each of the loads 5 and 6, and thereby it is possible to increase utilization efficiency of the capacitor 11 while each of the loads 5 and 6 are stably driven.

Figure 13:
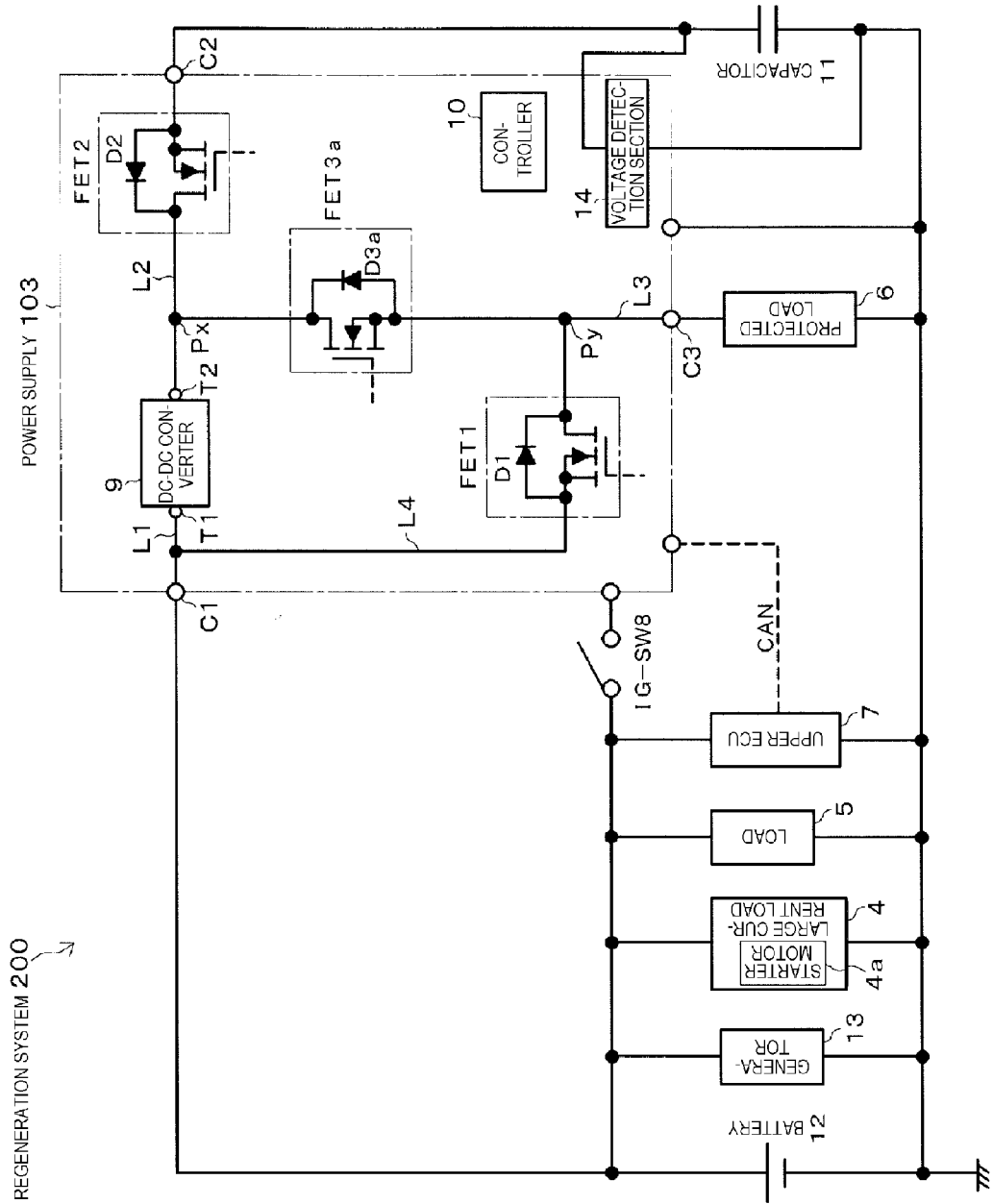
FIG. 13 is a diagram illustrating a circuit configuration of a power supply of a third embodiment of the invention.
Figure 14:
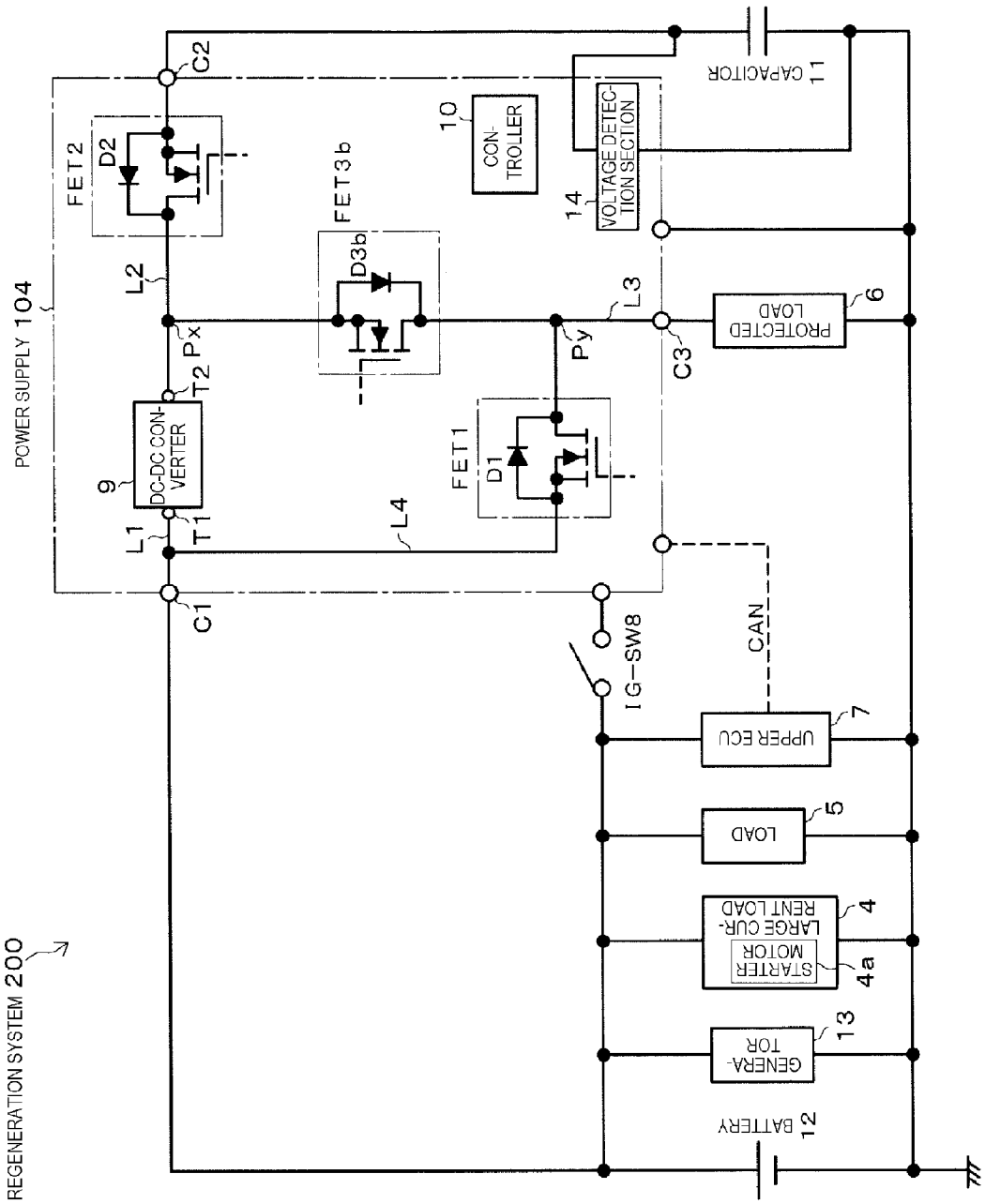
FIG. 14 is a diagram illustrating a circuit configuration of a power supply of a fourth embodiment of the invention.

The invention can employ various embodiments other than the embodiments described above. For example, in the second embodiment, as illustrated in FIG. 5 and the like, an example in which two FETs 3a and 3b are provided on the third power path L3 is illustrated, but the invention is not limited to only the above embodiment. As illustrated in FIGS. 13 and 14, one of the FETs 3a and 3b may be provided on the third power path L3.

In a power supply 103 of a third embodiment illustrated in FIG. 13, only the FET 3a is provided between a connection point Py to a fourth power path L4 on a third power path L3 and a connection point Px to the second power path L2. A drain of the FET 3a is connected to the second power path L2 and a source of the FET 3a is connected to the fourth power path L4 and the protected load 6. An anode of the parasitic diode D3a of the FET 3a is connected to the fourth power path L4 and the protected load 6, and a cathode is connected to the second power path L2.

According to the third embodiment, it is possible to supply power of the capacitor 11 or the battery 12 to the protected load 6 by turning on the FET 2 and the FET 3a. Furthermore, the regenerative power is supplied from the DC-DC converter 9 to the capacitor 11 while the regenerative power is supplied to the protected load 6 through the FET 1 by turning on the FETs 1 and 2, and by turning off the FET 3a when the regenerative power is generated by the generator 13. Thus, it is possible to charge the capacitor 11. In this case, the regenerative power which is boosted or stepped-down by the DC-DC converter 9 is supplied only to the capacitor 11 without supplying the regenerative power to the protected load 6. Thus, it is possible to increase the charging efficiency of the capacitor 11. However, in order to boost the regenerative power by the DC-DC converter 9, a large current may not flow through the DC-DC converter 9 and it is not necessary to use the DC-DC converter 9 having the high rated current.

In a power supply 104 of a fourth embodiment illustrated in FIG. 14, only the FET 3b is provided between the connection point Py to the fourth power path L4 on the third power path L3 and the connection point Px to the second power path L2. A source of the FET 3b is connected to the second power path L2 and a drain of the FET 3b is connected to the fourth power path L4 and the protected load 6. An anode of the parasitic diode D3b of the FET 3b is connected to the second power path L2 and a cathode is connected to the fourth power path L4 and the protected load 6.

According to the fourth embodiment, it is possible to supply power of the capacitor 11 or the battery 12 to the protected load 6 by turning on the FET 2 and the FET 3b. Furthermore, the regenerative power is supplied from the DC-DC converter 9 to the capacitor 11 by turning on the FETs 1 and 2, and by turning off the FET 3b when the regenerative power is generated by the generator 13. Thus, it is possible to supply the regenerative power to the protected load 6 through the FET 1 while the capacitor 11 is charged. Furthermore, it is possible to prevent the flow of the inrush current from the battery 12 or the generator 13 to the capacitor 11 through the diode D1 of the FET 1 by the FET 3b and the diode D3b by turning off the FET 3b.

In the second to fourth embodiments described above, examples in which the N-channel type MOSFETs 1, 2, 3a, and 3b are used as the first to third switching elements are illustrated, but the invention is not limited to only the embodiments. For example, other than that, a P-channel type MOSFET may be used. In addition, a junction FET may be used instead of the MOSFET. Furthermore, other switching elements such as a transistor or a relay may be respectively provided in each of the power paths L2 to L4.

Figure 15:
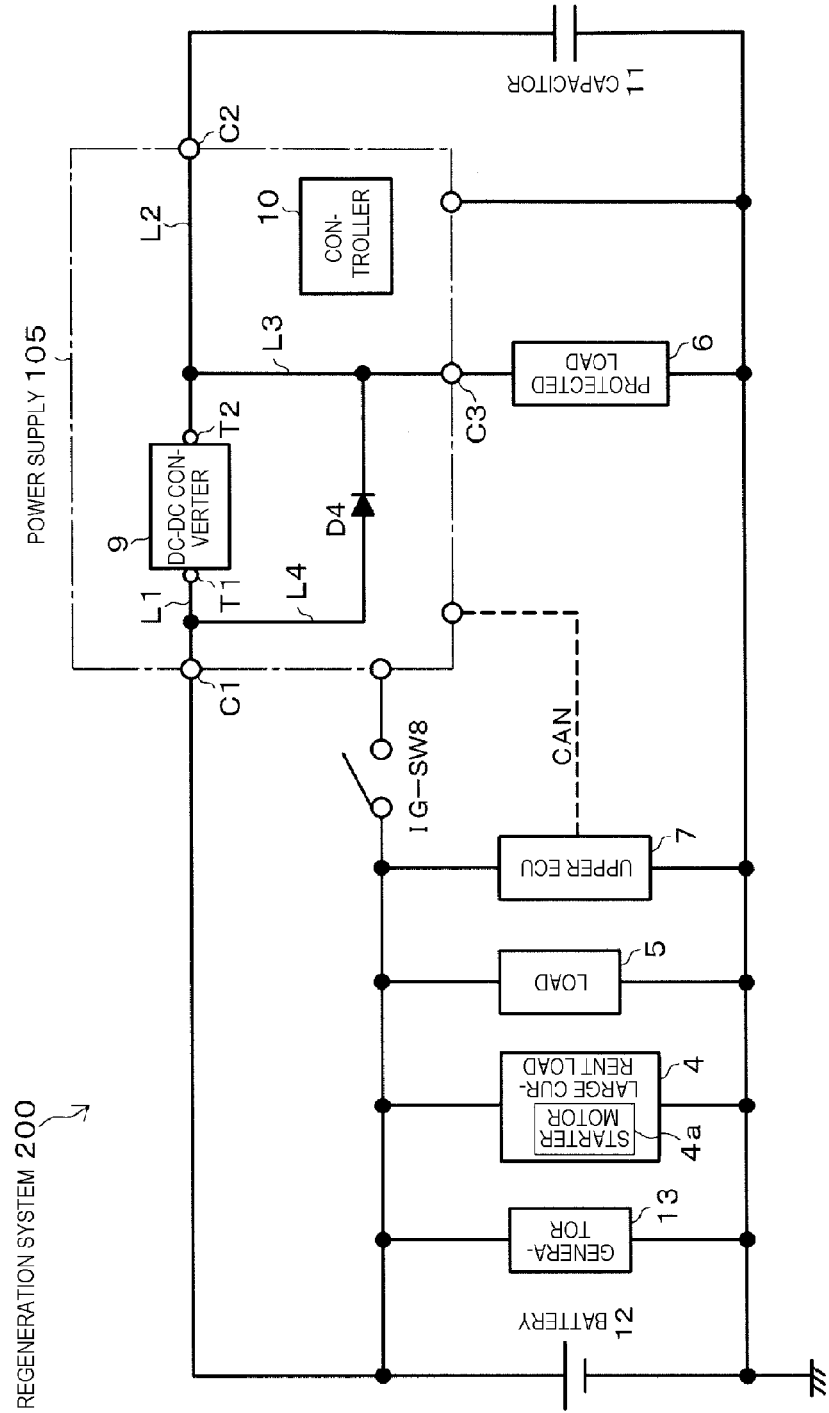
FIG. 15 is a diagram illustrating a circuit configuration of a power supply of a fifth embodiment of the invention.

Furthermore, as a power supply 105 of a fifth embodiment illustrated in FIG. 15, switching elements on the power paths L2 to L4 may be omitted. In the power supply 105, a diode D4 is provided on the fourth power path L4. An anode of the diode D4 is connected to the first power path L1 and a cathode is connected to the third power path L3. In the diode D4, a current flows from the first power path L1 side to the third power path L3 side. The diode D4 is an example of "rectifier" of one or more embodiments of the invention.

According to the fifth embodiment, it is possible to supply power of the battery 12 and the regenerative power of the generator 13 to the protected load 6 through the power paths L1, L4, and L3, and the diode D4. Particularly, even if the DC-DC converter 9 is stopped when the regeneration system 200 is in standby state, it is possible to supply power of the battery 12 to the protected load 6 through the power paths L1, L4, and L3, and the diode D4. Furthermore, it is possible to supply power of the capacitor 11 to the protected load 6 through the power paths L1, L4, and L3, and the diode D4 after passing through the DC-DC converter 9. Furthermore, for example, when actuating the starter motor 4a, it is possible to prevent power that is supplied from the third power path L3 to the protected load 6 from being drawn from the fourth power path L4 to the battery 12 side.

Furthermore, in the embodiments described above, examples in which the invention is applied to the power supplies 101 to 105 for the vehicle having the idling stop function and the deceleration regeneration function are provided, but the invention is not limited to the examples. For example, other than that, it is also possible to apply the invention to a power supply for a vehicle having the deceleration regeneration function but not having the idling stop function, or a power supply for another usage.

While the invention has been described with respect to a limited number of embodiments, those skilled in the art, having benefit of this disclosure, will appreciate that other embodiments can be devised which do not depart from the scope of the invention as disclosed herein. According, the scope of the invention should be limited only by the attached claims.

The invention claimed is:

1. A power supply comprising:
a first connection terminal connectable with a DC power supply to which a first load and a generator are connected in parallel;
a second connection terminal connectable with an electric storage which stores regenerative power generated by the generator;
a third connection terminal connectable with a second load;
a DC-DC converter;
a controller which controls an operation of the DC-DC converter;
a first power path comprising: one end connected to the first connection terminal; and the other end connected to a first input/output terminal provided in the DC-DC converter;
a second power path comprising: one end connected to the second connection terminal; and the other end connected to a second input/output terminal provided in the DC-DC converter;
a third power path comprising: one end connected to the third connection terminal; and the other end connected to the second power path;
a fourth power path comprising: one end connected to the first power path; and the other end connected to the third power path;
a rectifier which is provided on the fourth power path and which makes a current flow from a first power path side to a third power path side;
a first switching element provided on the fourth power path;
a second switching element provided between a connection point to the third power path on the second power path and the second connection terminal; and
a third switching element provided between a connection point to the fourth power path on the third power path and the second power path,
wherein the controller controls an on/off operation of each of the switching elements.

2. The power supply according to claim 1,
wherein the first switching element comprises a field effect transistor,
wherein the rectifier comprises a diode connected in parallel to the first switching element, and
wherein the diode that connected in parallel to the first switching element comprises: an anode connected to the first power path; and a cathode connected to the third power path.

3. The power supply according to claim 1,
wherein the second switching element comprises a field effect transistor to which a diode is connected in parallel, and
wherein the diode connected in parallel to the second switching element comprises: an anode connected to the second connection terminal; and a cathode connected to the third power path and the second input/output terminal of the DC-DC converter.

4. The power supply according to claim 1,
wherein the third switching element comprises a pair of field effect transistors which are connected in series and which are connected in parallel to diodes, respectively, and
wherein a direction of the diode connected in parallel to one of the pair of field effect transistors is opposite to a direction of the diode connected in parallel to the other of the pair of field effect transistors.

5. The power supply according to claim 1,
wherein the first load comprises a large current load through which a large current flows when actuated,
wherein the second load comprises a protected load required to be protected so as not to lower a voltage to be supplied,
wherein the power supply further comprises a voltage detector which detects a voltage of the electric storage,
wherein when the large current load is actuated, the controller turns on only the second switching element and the third switching element and supplies a current from the electric storage to the protected load if the voltage of the electric storage detected by the voltage detector is equal to or larger than a predetermined value required to drive the protected load, and
wherein the controller turns on only the third switching element, controls driving of the DC-DC converter, and supplies power of the DC power supply to the protected load if the voltage of the electric storage detected by the voltage detector is less than the predetermined value.

6. The power supply according to claim 1,
wherein when the regenerative power is generated by the generator, the controller turns on only the first switching element and the second switching element, supplies the regenerative power to the second load, controls driving of the DC-DC converter, and charges the electric storage by the regenerative power, and
wherein when the large current load included in the first load is stopped and power is not generated by the generator, the controller turns on only the first switching element and the second switching element, supplies power of the DC power supply to the second load, controls the driving of the DC-DC converter, and discharges the electric storage.

* * * * *